March 19, 1968     W. B. LARSON ET AL     3,373,484
METHOD OF PRODUCING A GREY IRON STEEL BRAKE DRUM
Filed Aug. 16, 1965     3 Sheets-Sheet 1

INVENTORS
William B. Larson &
Thomas W. Mueller
BY Peter P. Kozak
ATTORNEY

United States Patent Office 3,373,484
Patented Mar. 19, 1968

3,373,484
METHOD OF PRODUCING A GREY IRON STEEL BRAKE DRUM
William B. Larson and Thomas W. Mueller, Saginaw, Mich., assignors to General Motors Corporation, Detroit, Mich., a corporation of Delaware
Filed Aug. 16, 1965, Ser. No. 479,894
3 Claims. (Cl. 29—529)

This invention relates to brake drums and more particularly it relates to a process for making a composite grey iron brake drum having a steel liner for the braking surface.

The recent trend in production of high speed automobiles and the development and construction of modern roads and highways has led to vastly increased highway speeds. These trends have placed greater demands upon automotive braking systems. In response to these demands metallic brake linings have been developed which better withstand the high temperatures caused from the friction of braking from high speeds. Some of these new brake lining materials are disclosed in detail in U.S. Patents 2,945,291 and 2,945,929 which are assigned to the assignee of this invention. It has been found that these metallic brake linings require mating surfaces other than the grey iron brake drums which have been employed. It is known that a more satisfactory braking system is comprised of a metallic brake shoe operating in cooperation with a steel brake drum having a carbon content approximating that of an SAE 1080 steel.

However, a brake drum made entirely of such a steel composition would be more expensive than a cast iron brake drum. A solution to this problem is a composite brake drum the bulk of which is cast iron and the annular braking surface of which is an SAE 1080 steel or the equivalent.

Accordingly it is an object of this invention to provide a method of producing a grey iron brake drum having a steel liner braking surface.

It is a further object of this invention to provide a method of producing a composite brake drum in which all of the drum except the braking surface is grey cast iron and in which the braking surface is an annular steel liner having a carbon content of about 0.75% to 0.88% by weight.

It is another object of this invention to provide a cast iron brake drum with a steel braking surface wherein the carbon content in said steel liner is from about 0.75% to about 0.88%.

These and other objects are accomplished by preparing a suitable mold having a cavity of the configuration of the brake drum, inserting an annular steel rim liner having a carbon content of about 0.2% to 0.3%, pouring molten grey cast iron into the cavity so that it fills the cavity and completely envelops the steel liner, air cooling the casting whereby a metallurgical bond is developed between the steel and the grey iron of a minimum boundary area, heat treating the composite casting to effect a diffusion of carbon from the grey iron into the steel to increase the carbon content in the steel to about 0.75% to 0.88%, and machining away the inner layer of cast iron from the steel liner to expose a high carbon steel braking surface.

Other objects and advantages will be seen from a more detailed description of the process including a specific example which follows.

Figure 1:
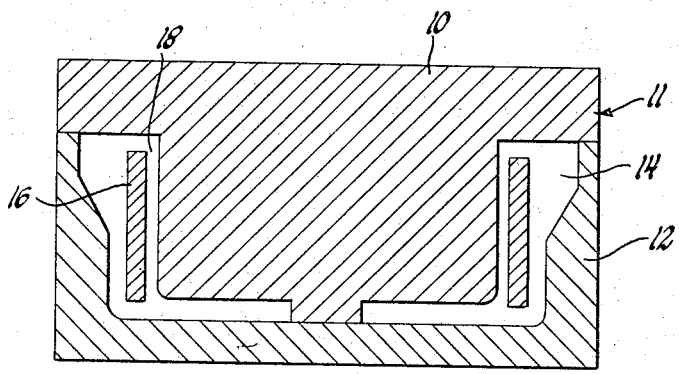
FIGURE 1 is a sectional view of a suitable mold containing the steel rim and having a cavity of the configuration of the brake drum.

The grey iron which is suitable for use in the process of this invention is of a grade typically used in automotive castings. The most important alloying constituent to the practice of this process is carbon and it should preferably be present in the iron to the extent of 3.2 to 3.5% by weight. Grey iron normally is characterized by a carbon content of 2.5 to 3.5%. Other alloying elements are normally present in grey iron, but their exact content is not so critical. In a typical grey iron, these other elements would comprise manganese (0.60% to 0.75% by weight), silicon (2.20% to 2.40% by weight), chromium (0.03% to 0.06% by weight), sulfur (0.15% maximum), and phosphorus (0.15% maximum).

The steel brake liner, on the other hand, is made from a low alloy formable steel which is shaped to provide the braking surface by any suitable process, such as rolling and butt welding or drawing. Again carbon is the critical alloying element and it should preferably be present in the steel to the extent of 0.2% to 0.3% by weight. Other elements such as manganese, sulfur and phosphorus may be present in small amounts. For example, a typical steel would comprise manganese (0.60% to 0.75% by weight), phosphorus (0.04% by weight maximum), and sulfur (0.05% by weight maximum) in addition to the iron and carbon.

In accordance with the process of this invention, a suitable mold is prepared having a cavity in the configuration of the brake drum. Such a mold 11 is shown in FIGURE 1 having a cope 10, drag 12 and cavity 14. A low alloy steel strip 0.112" thick containing 0.3% carbon is rolled and butt welded to form an annular liner 16. The thickness of this strip may, of course, vary to fit specific requirements. The liner 16 is then inserted into the cavity 14. There must be a space 18 between the liner 16 and the inside wall of the drag 12.

Figure 4:
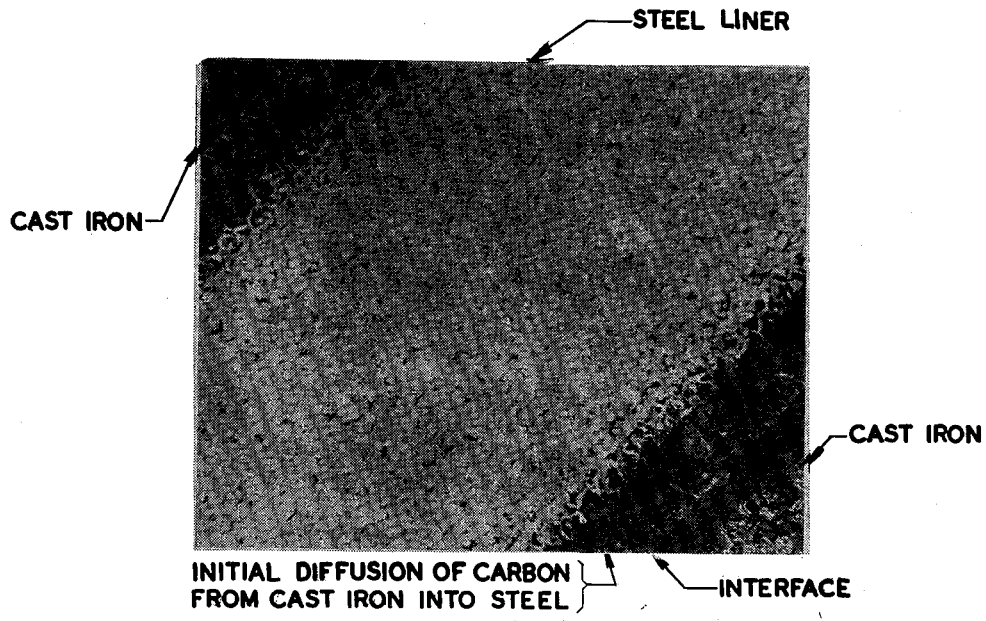
FIGURE 4 is a photomicrograph (40×, Nital Etch) of the as cast drum showing the steel liner and the cast iron interface.
Figure 5:
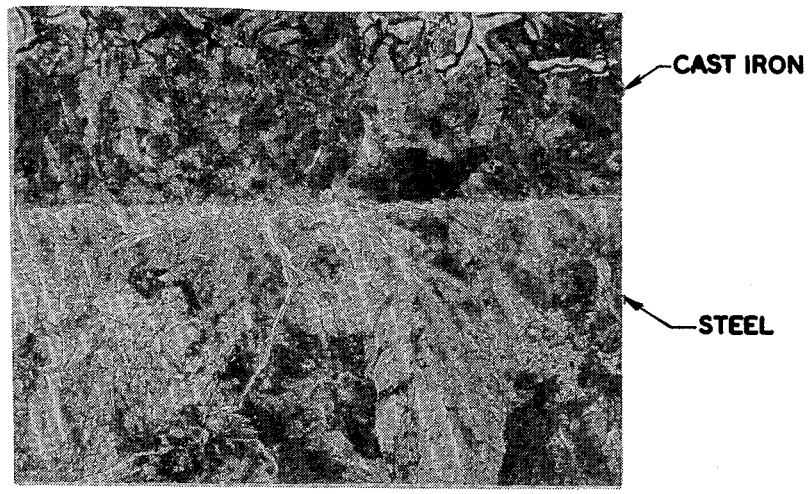
FIGURE 5 is a photomicrograph (200×, Nital Etch) showing the interface at a higher magnification.

Molten grey iron having a carbon content of 3.3% is poured into the mold 11 (through means not shown) completely filling the cavity 14 as well as completely enveloping the steel liner 16 and upon air cooling a metallurgical bond forms between the steel 16 and the grey iron 20. This bond extends over a minimum boundary area between the steel and the cast iron preferably on the order of 0.003" thick. FIGURE 4 is a photomicrograph of the boundary showing a portion of the steel liner and the adjacent cast iron as cast. In FIGURE 4 the light area which extends from the lower left hand corner to the upper right hand corner is the ferritic steel liner. The dark areas in the upper left hand corner and lower right hand corner represent adjacent cast ion. The diagonal lines in these two corners between the steel and the cast iron are the interfaces. It can be seen from the dark area extending into the steel liner from the interface that some diffusion of carbon from the cast iron has already taken place. FIGURE 5 is a further enlarged photomicrograph of the as cast interface region. In FIGURE 5 the cast iron is in the upper portion of the photomicrograph and the lower portion is the steel rim. Although the cast iron with its high carbon content is considerably darker, it can again be seen from the presence of the pearlite in the originally low carbon steel that some carbon diffusion has taken place.

Figure 2:
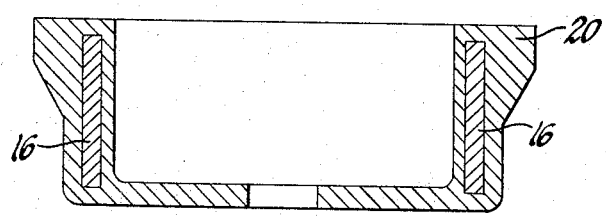
FIGURE 2 is a schematic sectional drawing of the casting.

After the casting has cooled it may be removed from the mold. This stage is as shown in FIGURE 2. The grey iron 20 constitutes the bulk of the brake drum but there is a steel liner 16 whch is completely enveloped therein.

Figure 6:
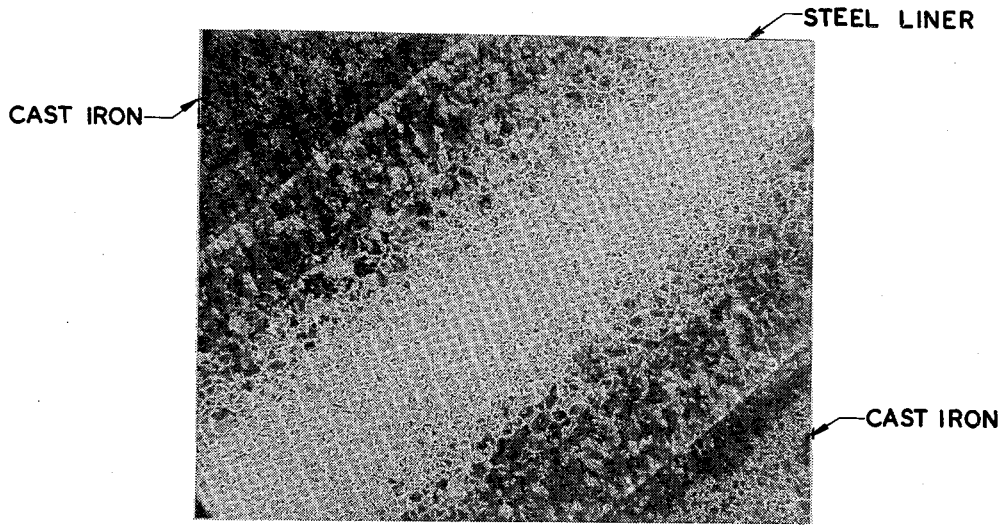
FIGURE 6 is a photomicrograph (40×, Nital Etch) showing a portion of the steel liner after partial heat treatment.
Figure 7:
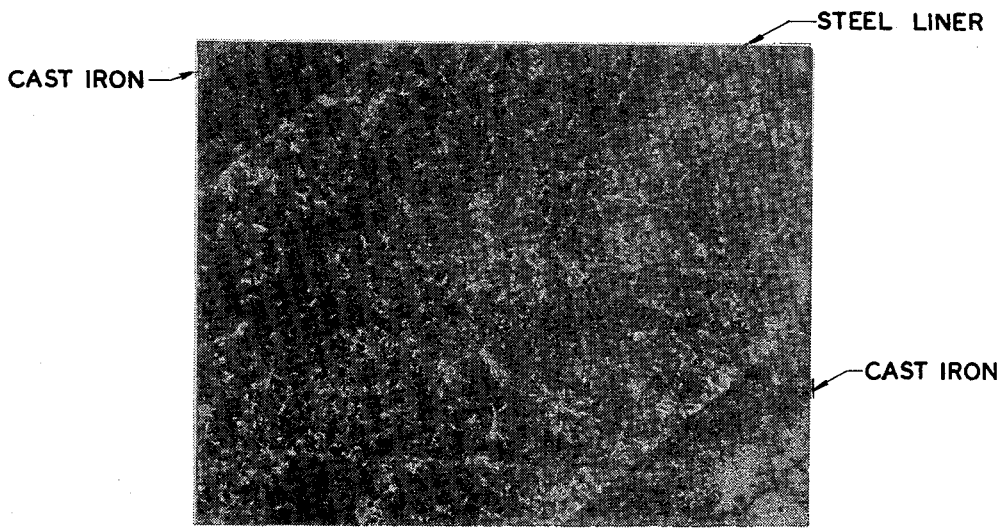
FIGURE 7 is a photomicrograph (40×, Nital Etch) showing a portion of the steel liner after complete heat treatment.

While the low carbon content of the steel was conducive to its being formed into its annular shape, it does not render such a steel sufficiently durable for use as a braking surface. Therefore, it is necessary that the carbon content of the steel rim or liner be increased to approximately that which is found in an SAE 1080 steel, about 0.75 to 0.88%. This is achieved by a carburizing heat treatment. The casting is heated to a temperature above the upper critical temperature of the low alloy steel, preferably about 1650° F. An operable range would be from about 1600° to about 2000° C. However, a practical upper limit is probably about 1750° because of normal furnace operation temperatures. The casting is maintained at a temperature in this range until sufficient carbon has diffused from the grey iron into the steel to increase its carbon content to from about 0.75% to 0.88%. With the steel liner of this example, 0.112″ thick, and a heat treat temperature of 1650° F., this diffusion process requires about 8 hours. FIGURE 6 is a photomicrograph of a portion of the steel liner and adjacent cast iron showing the microstructure of the liner after partial heat treatment. The advantage of casting the grey iron completely around the steel liner is apparent. The carbon can diffuse into the steel rim from both sides. In addition, no special carburizing atmosphere is required. At the temperature of the carburizing heat treatment, the carbon is in solid solution, however, upon cooling pearlite is formed. FIGURE 7 is a photomicrograph of the steel liner portion of the casting taken at the completion of the heat treatment. The steel liner now has a substantially completely pearlitic microstructure.

Figure 3:
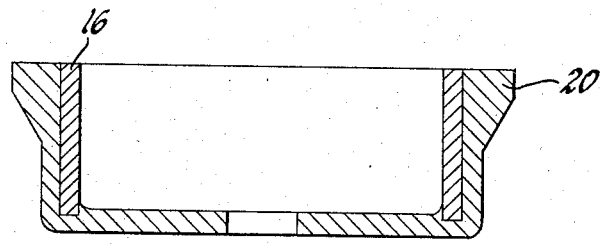
FIGURE 3 is a schematic sectional drawing of the finished brake drum.

At the completion of the heat treatment the grey iron is machined from the inside of the casting to expose the carburized steel liner as a braking surface. The brake drum, as shown in FIGURE 3, consists of the cast iron supporting element 20 and the steel liner braking surface 16.

Thus the respective advantages of a cast iron drum and a durable steel braking surface have been combined into one article. The steel liner is shaped from a readily formable low carbon steel. Its carbon content is subsequently increased to that required for an effective braking surface by a process which eliminates the need for special carburizing atmosphere. This brake drum can and has been used with metallic brake shoes to form an effective braking system of long life despite frequent stops from high vehicular speeds.

While this invention has been described in terms of a preferred method of producing a composite brake drum, it is apparent that the carburizing step of this process could be applied to any composite article containing a cast iron portion and a steel portion in which it is desired to increase the carbon content. Since other forms of the invention could be adopted by one skilled in the art, the scope thereof is limited only by the claims herein stated.

We claim:
1. A method of producing a composite brake drum consisting predominantly of cast iron and having a durable annular steel braking surface, said method comprised of forming a low carbon steel into the annular shape of said braking surface, casting grey iron entirely about said steel shape in the configuration of the brake drum, heating the composite casting at a temperature above the upper critical temperature of said low carbon steel and below 2000° F. until sufficient carbon has diffused from said grey iron into said steel to raise the carbon content of said steel annular surface from about 0.75 to about 0.88%, and machining said grey iron from the inside surface of said steel annular surface to expose said durable steel braking surface.

2. A method as in claim 1 wherein the carbon content of said low carbon steel is from about 0.2% to 0.3%.

3. A method as in claim 1 in which the temperature of said heat treatment is in the range of from about 1600° F. to about 1750° F.

References Cited
UNITED STATES PATENTS

| | | |
|---|---|---|
| 1,804,763 | 5/1931 | Good et al. |
| 2,042,701 | 6/1936 | Dake et al. |
| 2,476,151 | 7/1949 | Le Jeune _____ 29—529 |
| 2,738,038 | 3/1956 | Horn et al. _____ 29—529 |
| 3,305,918 | 2/1967 | Christen et al. _____ 29—529 |

JOHN F. CAMPBELL, *Primary Examiner.*

PAUL M. COHEN, *Assistant Examiner.*